United States Patent [19]

Fukuoka

[11] Patent Number: 5,479,200
[45] Date of Patent: Dec. 26, 1995

[54] METHOD AND AN APPARATUS FOR FIXING TONER TO A PRINTING SHEET OR WEB WITH A LASER BEAM

[75] Inventor: Toshimi Fukuoka, Kanagawa, Japan

[73] Assignee: Sony Corporation, Tokyo, Japan

[21] Appl. No.: 107,011

[22] Filed: Aug. 17, 1993

[30] Foreign Application Priority Data

Aug. 26, 1992 [JP] Japan .................. 4-227482

[51] Int. Cl.$^6$ ................................ G01D 15/14
[52] U.S. Cl. ............... 347/129; 347/139; 347/140; 347/156; 347/224; 347/253; 347/131
[58] Field of Search .................. 346/76 L, 108, 346/109, 160, 153.1, 159; 358/298; 347/129, 139, 140, 156, 264, 224, 51, 158, 253, 131

[56] References Cited

U.S. PATENT DOCUMENTS

| | | | |
|---|---|---|---|
| 4,217,819 | 8/1980 | von Tluck et al. | 346/153.1 X |
| 4,338,615 | 7/1982 | Nelson et al. | 346/160 |
| 4,492,482 | 1/1985 | Eguchi et al. | 346/76 PH |
| 4,641,955 | 2/1987 | Yuasa | 346/159 |
| 4,694,310 | 9/1987 | Saito et al. | 346/153.1 |
| 4,764,776 | 8/1988 | Mugraner et al. | 346/76 L X |
| 4,804,975 | 2/1989 | Yip | 346/76 L |
| 4,963,990 | 10/1990 | Henderson et al. | 358/298 |
| 5,066,962 | 11/1991 | Sarraf | 346/76 L |
| 5,084,718 | 1/1992 | Yamazaki et al. | 346/159 X |
| 5,128,699 | 7/1992 | Nakajima et al. | 346/160 |
| 5,253,023 | 10/1993 | Hosaka et al. | 355/279 |
| 5,313,233 | 5/1994 | Nagase et al. | 346/108 |

FOREIGN PATENT DOCUMENTS

| | | | |
|---|---|---|---|
| 56-28873 | 3/1981 | Japan | 400/120 |
| 61-283569 | 12/1986 | Japan | 346/76 PH |

*Primary Examiner*—Peter S. Wong
*Assistant Examiner*—Randy W. Gibson
*Attorney, Agent, or Firm*—Ronald P. Kananen

[57] ABSTRACT

A dry-type toner is temporarily put on a printing paper with electrification by an electrifying unit and a toner supplying unit. A laser diode is driven on the basis of a video signal to emit a laser beam by which the dry-type toner put on the printing paper is melted and fixed thereon. A remaining toner that was not melted on the printing paper is eliminated by a cleaning unit. A printing by the laser beam can be realized most easily without using expensive parts such as a photosensitive material or the like and without increasing its mechanism and circuit scale. A printing apparatus includes a body circuit (4) for producing a driving signal on the basis of a video signal, an electrifying unit (10) and a toner supplying unit (11) for temporarily putting a dry-type toner on a printing paper (5) with electrification, a laser diode (3) being driven by the driving signal from the body circuit (4) to emit a laser beam to melt the dry-type toner put on the printing paper (5) with electrification by the electrifying unit (10) and the toner supplying unit (11) so that the dry-type toner thus melted is fixed on the printing paper (5) and a cleaning unit (9) for eliminating a remaining toner that is not melted on the printing paper (5).

9 Claims, 7 Drawing Sheets

METHOD AND AN APPARATUS FOR FIXING TONER TO A PRINTING SHEET OR WEB WITH A LASER BEAM

BACKGROUND OF THE INVENTION

1. Field of the Invention

The present invention relates to a printing apparatus and a laser diode driving apparatus suitable for use with a laser printer or the like.

2. Description of the Prior Art

U.S. Pat. No. 4,492,482, for example, describes a printer for printing an image on a printing paper. Also, there is proposed a printing machine (printer) called a laser printer.

The conventional laser printer emits a laser beam modulated by an image signal to scan a mirror called a polygon mirror. A laser beam reflected by the polygon mirror is irradiated on an organic photoconductor (i.e., OPC) sheet to render the OPC a conductivity corresponding to the intensity of the laser beam, whereafter an electrostatic latent image, i.e., an electrostatic electrified pattern having a pattern corresponding to light and shade of an original image formed on the OPC is formed on the surface called an OPC sheet by the discharge of the OPC. A toner is put on the surface of the OPC with electrification on which this electrified pattern is formed. Further, the OPC with the toner and a printing paper are closely contacted. Under this condition that the OPC and the printing paper are held close to each other, they are heated and pressed to put the toner corresponding to original image data on the printing paper with electrification and then the toner is fixed onto the printing paper. Thus, the original image data is printed (or set) on the printing paper.

Although it is customary that such laser printer obtains a printed image according to binary information of white or black, according to the recent laser printer, a signal supplied to a driving unit that drives a laser diode to emit a laser beam is modulated to provide a pulse width modulated (PWM) signal to thereby obtain a middle tone in a pseudo gray scale fashion.

The above-mentioned laser printer using the OPC is produced very expensively because the OPC is expensive. Also, the mechanism thereof and the circuit scale thereof become complex and enlarged.

According to the above-mentioned method of supplying the pulse width modulated signal to the driving unit in order to obtain an intermediate tone, the signal can be modulated only in the beam scanning direction and the signal cannot be modulated in the planar direction. Therefore, when the diameter of the beam spot is reduced to enlarge the spacing between the scanning lines, the spacing between the scanning lines becomes a so-called unprinted portion. There is then the disadvantage that density of a printed image cannot be increased.

OBJECTS AND SUMMARY OF THE INVENTION

In view of the aforesaid aspects, it is a general object of the present invention to provide an improved printing apparatus and laser diode driving apparatus in which the aforesaid shortcomings and disadvantages encountered with the prior art can be eliminated.

More specifically, it is an object of the present invention to provide a printing apparatus and a laser diode driving apparatus which can be produced inexpensively.

It is another object of the present invention to provide a printing apparatus and a laser diode driving apparatus which can be simplified in mechanism and circuit arrangement.

It is a further object of the present invention to provide a printing apparatus and a laser diode driving apparatus in which a spacing between scanning lines can be eliminated to provide density of a printed image over a wide range.

It is yet a further object of the present invention to provide a printing apparatus and a laser diode driving apparatus in which an excellent printed image can be obtained.

According to a first aspect of the present invention, there is provided an apparatus for printing an image on a paper which is comprised of a device for putting a dry-type toner on a paper with electrification, a device for generating a laser driving signal according to an input signal representing the image, a device for outputting a laser beam according to the laser driving signal, and partly melting the dry-type toner on the paper by the laser beam, and a device for removing the dry-type toner which is not melted by the laser beam, whereby the image is formed on the paper.

According to a second aspect of the present invention, there is provided an apparatus for printing an image on a paper which is comprised of a device for electrifying a paper, (viz., applying a static electrical charge) a device for supplying a dry-type toner to the paper, a device for generating a laser driving signal according to an input signal representing the image, a device for outputting a laser beam according to the laser driving signal, and partly melting the dry-type toner on the paper by the laser beam, and a device for removing the dry-type toner which is not melted by the laser beam, whereby the image is formed on the paper.

In accordance with a third aspect of the present invention, there is provided a method of printing an image on a paper which comprises the steps of electrifying a paper, with a static electrical charge supplying a dry-type toner to the paper, generating a laser driving signal according to an input signal representing an image, partly melting the dry-type toner on the paper by a laser beam according to the laser driving signal, and removing the dry-type toner which is not melted by the radiation of the laser beam.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which.

DETAILED DESCRIPTION OF THE PREFERRED EMBODIMENT

A printing apparatus and a laser diode driving apparatus according to an embodiment of the present invention will hereinafter be described with reference to the drawings.

Figure 1:
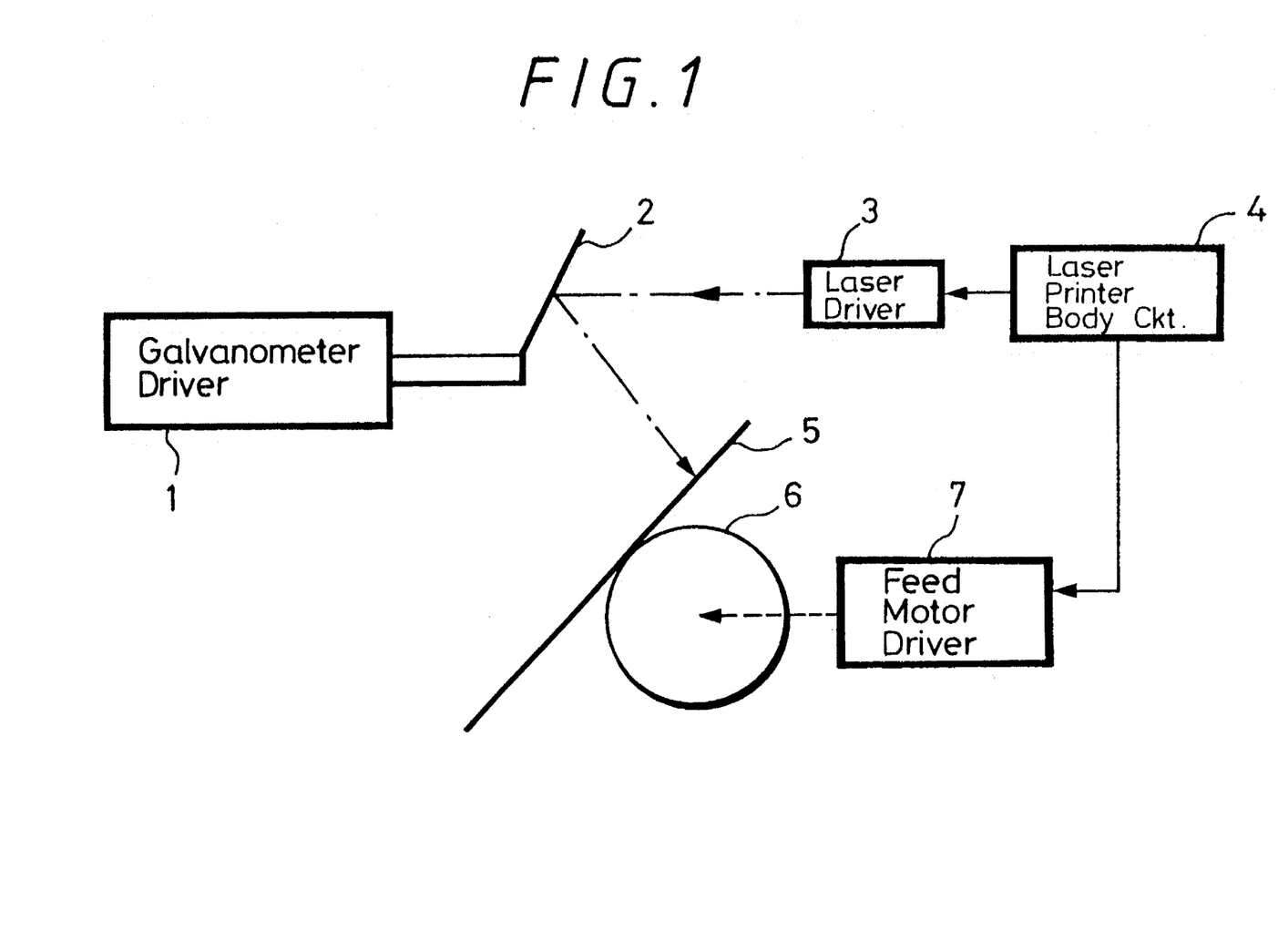
FIG. 1 is a diagram showing an arrangement of a printing apparatus according to an embodiment of the present invention.

FIG. 1 of the accompanying drawings shows the printing apparatus according to the embodiment of the present invention.

As shown in FIG. 1, there is provided a galvanometer driver 1 which changes a reflection angle of a galvanometer 2 on the basis of, for example, a control signal from a laser printer body circuit 4.

A laser diode 3 emits a laser beam on the basis of a drive signal from the above-mentioned laser printer body circuit 4. A laser beam emitted from the laser diode 3 is reflected by the galvanometer 2 and then radiates the surface of a printing paper 5.

The laser printer body circuit 4 inverts a polarity of an input video signal to obtain a driving signal on the basis of the video signal whose polarity was inverted. The laser diode 3 is driven by this driving signal.

The printing paper 5 is sequentially fed by a feed roller 6 that is rotated by a driving force of a feed motor driver 7 which is driven to output a driving signal under the control of the control signal from the laser printer body circuit 4.

Figure 2:
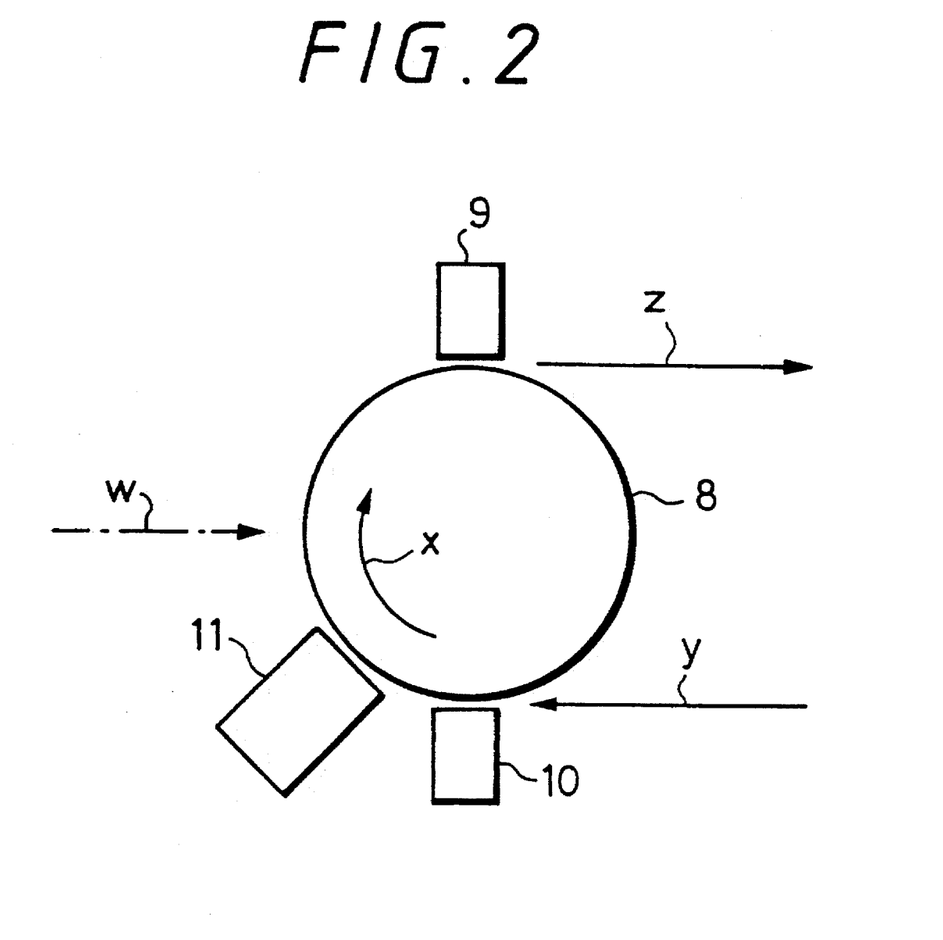
FIG. 2 is a diagram showing an arrangement of a main portion of the printing apparatus according to the embodiment of the present invention.

The printing paper 5 is fed by the feed roller 6 in the direction shown by an arrow y in FIG. 2 relative to a drum 8, guided so as to be wrapped around the drum 8 and then ejected in the direction shown by an arrow z in FIG. 2.

As shown in FIG. 2, an electrifying unit 10 is provided near the paper feeding mouth of the drum 8. The electrifying unit 10 includes an electrode 12 shown in FIG. 3A, and the printing paper 5 transported from the direction shown by the arrow y in FIG. 2 is charged with, for example, a charge having a negative polarity by the electrode 12.

A toner supplying unit 11 is provided at the position distant from the electrifying unit 10 by a predetermined distance. The toner supplying unit 11 applies a charged dry-type toner, for example, on the printing paper 5. The toner put on the printing paper 5 is fixed on the printing paper 5 by a laser beam (shown by a one-dot chain line arrow w in FIG. 3C) emitted from the laser diode 3 and reflected by the galvanometer 2 shown in FIG. 1.

A cleaning unit 9 is disposed near the paper eject mouth of the drum 8 as shown in FIG. 2. The cleaning unit 9 includes the electrode 12 shown in FIG. 3D to positively charge the printing paper 5.

Any unnecessary toner that was not melted and fixed on the printing paper 5 by the laser beam is removed from the printing paper 5 by the cleaning unit 9 and the unnecessary toner thus eliminated is stored in a storage unit (not shown) of the cleaning unit 9.

Operation of the aforesaid printing apparatus will be described with reference to FIGS. 3A through 3D.

Figures 3A, 3C:
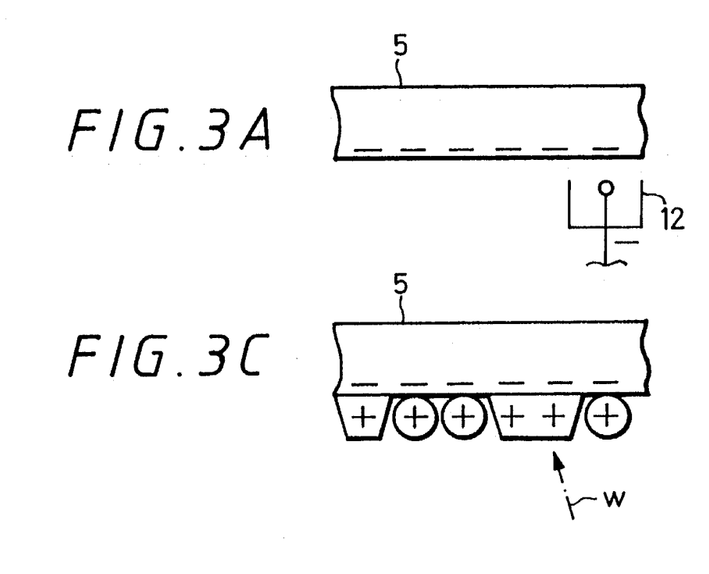
FIGS. 3A through 3D are respectively diagrams used to explain the printing apparatus according to the embodiment of the present invention.

When the printing paper 5 is fed in the direction shown by the arrow y in FIG. 2, the printing surface of the printing paper 5 is negatively charged by the electrode 12 of the electrifying unit 10 as shown in FIG. 3A.

Figure 3B:
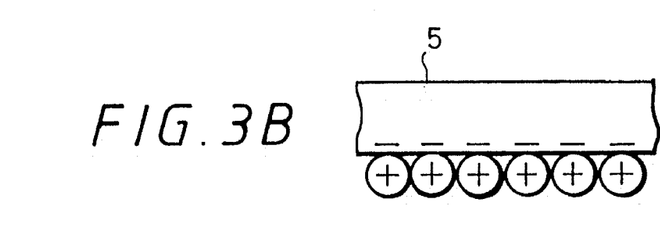

When the printing paper 5 reaches the toner supplying unit 11 (see FIG. 2), as shown in FIG. 3B, the charged toner (shown by "+" in FIG. 3B) is applied the printing surface of the printing paper 5 by the toner supplying unit 11.

Subsequently, when the laser beam w, emitted from the laser diode 3 and reflected by the galvanometer 2, is irradiated on the printing paper 5, as shown in FIG. 3C, the toner corresponding to the low level portion indicative of a black portion of a video signal is melted and fixed to the printing paper 5.

Figure 3D:
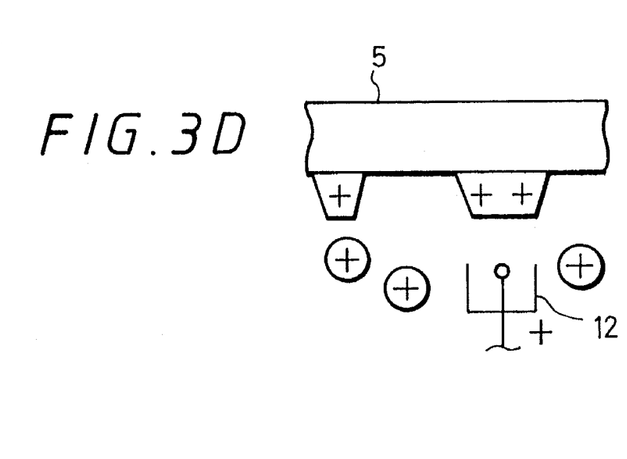

When the printing paper 5 in this state reaches the cleaning unit 9 (see FIG. 2), as shown in FIG. 3D, the printing paper 5 is positively charged by the electrode 12 of the cleaning unit 9, whereby the unnecessary excess toner remaining on the printing paper 5 is eliminated from the printing paper 5 and then stored in the storage unit (not shown) of the cleaning unit 9.

As described above, according to this embodiment, since the toner is put on the printing paper 5 with electrostatic electrification and then fixed thereon by the radiation of the laser beam, the printing by the laser beam can be realized with ease without utilizing expensive parts such as a photosensitive material or the like and without enlarging a mechanism and a circuit scale of the apparatus.

When the driving signal that drives the laser diode 3 is generated by the driving circuit (not shown) in the laser printer body circuit 4, it is customary that a video signal is pulse-width-modulated (PWM). According to this method of obtaining the driving signal by the pulse width modulation, however, the video signal can be modulated only in the laser beam scanning direction and cannot be modulated in the direction perpendicular to the scanning direction.

More specifically, the video signal is area-modulated in the laser beam scanning direction and cannot be modulated in the planar direction so that, when the spacing between the scanning lines is increased, the spacing between the scanning lines takes place as a so-called unprinted portion. There is then the disadvantage that density of a printed image cannot be increased.

Figure 4:
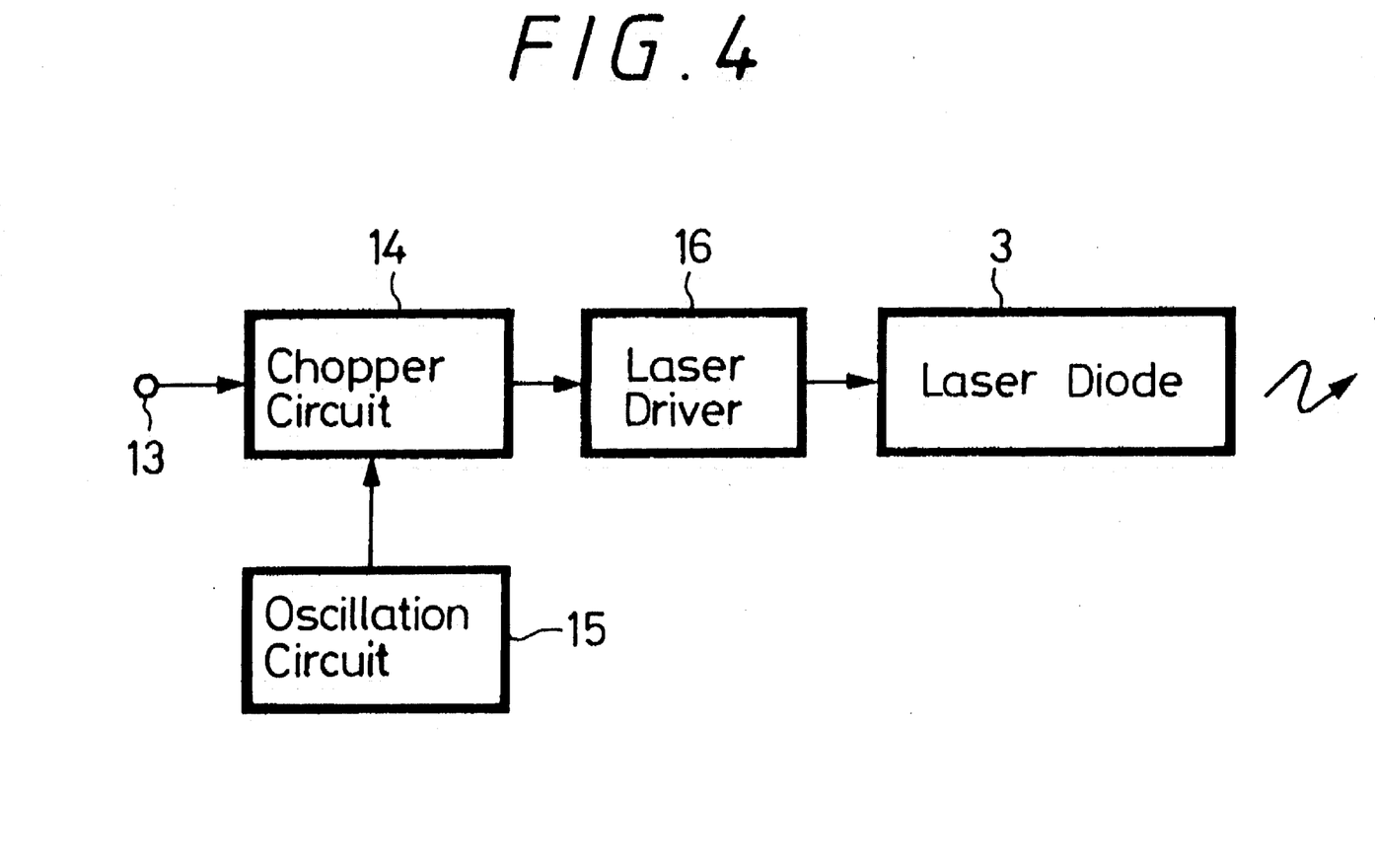
FIG. 4 is a diagram showing an arrangement of a laser diode driving apparatus according to an embodiment of the present invention.

Therefore, according to the embodiment of the present invention, the driving circuit (not shown) in the laser printer body circuit 4 is arranged as shown in FIG. 4 to obtain an intermediate tone by the area modulation in a pseudo gray scale fashion.

The aforesaid operation will be described with reference to FIGS. 4 to 7. A method of obtaining an intermediate tone by using the area modulation in a pseudo gray scale fashion that will be described below can be employed both when the printing paper 5 is printed by the radiation of laser beam without using the above-mentioned OPC (organic photoconductor) and when the OPC is used. Therefore, both cases will be described hereinafter.

Initially, the printing operation using the OPC will be described.

As shown in FIG. 4, there is provided an input terminal 13 to which there is supplied a video signal (see FIG. 5A) from the video signal processing circuit (not shown) or the like in the laser printer body circuit 4. The video signal from the video signal processing circuit or the like is supplied through the input terminal 13 to a chopper circuit 14.

Figure 5A:
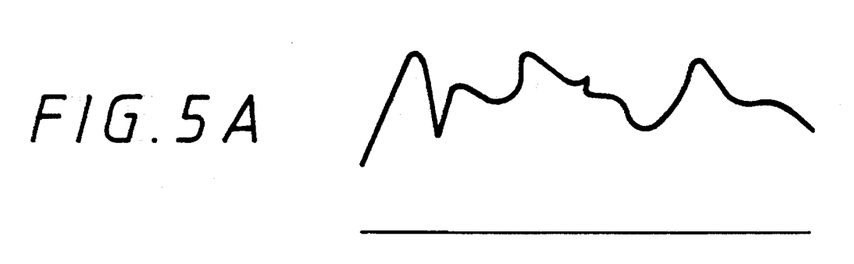
FIGS. 5A and 5B are respectively diagrams used to explain the laser diode printing apparatus according to the embodiment of the present invention.
Figure 5B:
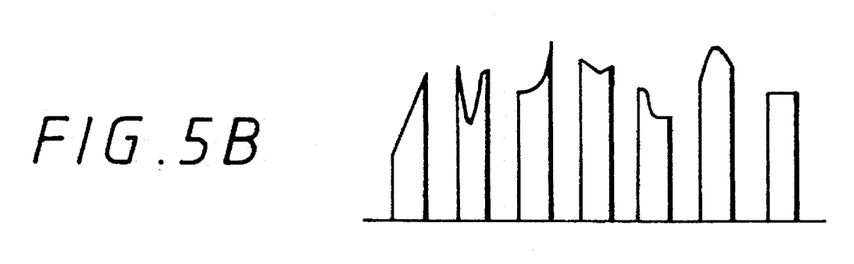

The chopper circuit 14 processes the video signal on the basis of an oscillation signal having a predetermined frequency supplied thereto from an oscillation circuit 15 as shown in FIG. 5B. The signal thus processed by the chopper circuit 14 is supplied to a laser driver 16.

The laser driver 16 produces a drive signal on the basis of the output signal from the chopper circuit 14 and supplies the driving signal to the laser diode 3 so that the laser diode 3 can be driven.

Processing of the chopper circuit 14 will be described more with reference to FIGS. 6A and 6B. The chopper circuit 14 switches the video signal and holds the original video signal at low "0" level intermittently.

When the laser beam is modulated by this signal, a binary electrostatic image of high or low level is obtained on the OPC surface. If the level of the input signal is high, then a skirt portion of a Gaussian distributed beam shape is reacted and a reacted portion is widened on the OPC.

Figure 6A:
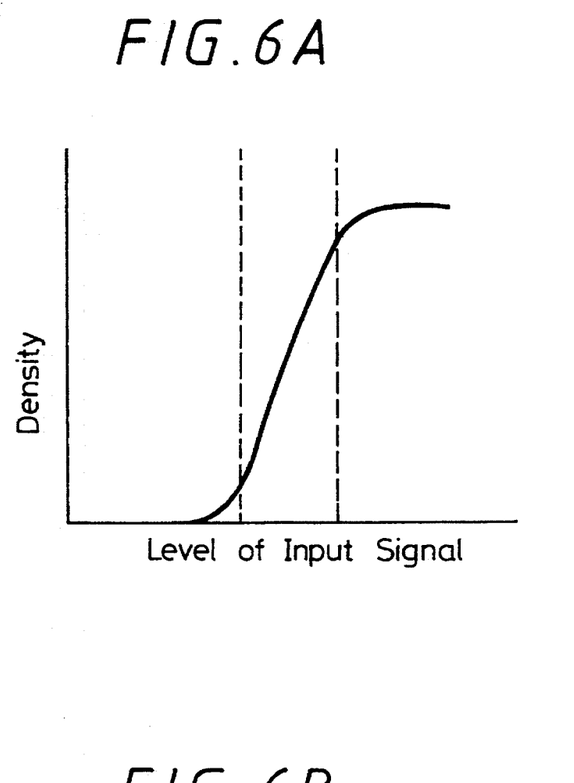
FIGS. 6A and 6B are respectively diagrams used to explain the laser driving apparatus according to the embodiment of the present invention.

In FIG. 6A, a range shown by dashed lines represents a threshold level in which even a binary linear region exists. This width is a portion between two dashed lines and a region outside of this range can be treated as a binary value.

Figure 6B:
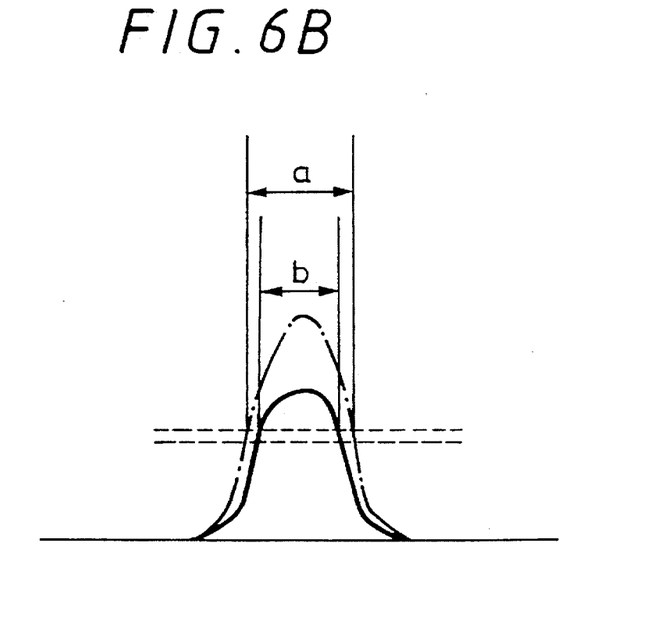

FIG. 6B is a diagram showing the case that a diameter of beam spot is equivalently increased when a beam current is increased. When the level of the input signal exceeds the threshold level shown in FIG. 6A, the diameter of beam spot is equivalently widened from a beam spot shown in FIG. 7B to a beam spot shown in FIG. 7A, i.e., a beam spot having a diameter b becomes a beam spot having a diameter a shown in FIG. 6B. In other words, the fact that the level of the input signal exceeds the threshold level shown in FIG. 6A is similar to the fact that the level of the input signal exceeds the threshold level shown in FIG. 6B. Thus, the binary operation is carried out. The two threshold levels (shown by dashed lines) in FIG. 6A are close to each other in the threshold level shown in FIG. 6B and therefore can be considered as one threshold level.

As the diameter of the beam spot is increased, the space between the scanning lines can be reduced so that an excellent printed image free of any unprinted portion can be obtained.

In order to obtain a printed image by using the OPC, there are some patterns such as when the OPC is positively electrified and the toner is negatively electrified, or when the OPC is negatively electrified and the toner is positively electrified or the like.

When the OPC is made positively electrified and the toner is negatively electrified and when the OPC is negatively electrified and the toner is positively electrified, a portion that radiated with the laser beam is exhibits at a potential of substantially "0" and toner does not adhere thereto. Accordingly the video signal need not be inverted in polarity as earlier noted with reference to FIGS. 1 to 3.

Therefore, in this case, as shown in FIGS. 5A and 5B, the input video signal (FIG. 5A) is processed (FIG. 5B) by the chopper circuit 14 and fed to the laser driver 16 as shown in FIG. 4.

Printing operation will be described below.

Referring back to FIG. 4, when the video signal is supplied through the input terminal 13 to the chopper circuit 14, the chopper circuit 14 processes this video signal on the basis of the oscillation signal supplied thereto from the oscillation circuit 15. The signal thus obtained by the processing of the chopper circuit 14 is supplied to the laser driver 16.

The laser driver 16 drives the laser diode 3 on the basis of the signal supplied thereto from the chopper circuit 14. A laser beam emitted from the laser diode 3 is reflected by some suitable means such as the galvanometer 2 shown in FIG. 1 or the like, whereafter the laser beam becomes incident on the OPC.

When the OPC is electrified with a positive or negative polarity and the toner is electrified with a negative or positive polarity, only a portion irradiated with the laser beam becomes conductive. Such radiated portion is given conductivity whose magnitude corresponds to the intensity of the laser beam and is then discharged, thereby forming an electrostatic electrified pattern having a pattern corresponding to light and shade of an original image, i.e., an electrostatic latent image on the OPC sheet.

When the toner is put on the OPC sheet with electrification, the toner is not fixed to the OPC sheet at the portion or portions irradiated with the laser beam. Accordingly, portions to which toner is fixed and the portions to which the toner is not fixed are formed on the OPC sheet. Under this condition, when the OPC sheet is held close with the printing paper 5, heated and pressed, then a printed image can be obtained.

As described above, according to this embodiment, since the video signal is intermittently held at "0" level and the laser diode 3 is driven on the basis of such signal, density of a printed image can be obtained in a wide range without the so-called unprinted portion. Also, the apparatus of the present invention can be simplified in circuit arrangement as compared with that provided by the pulse width modulation system. Further, an inexpensive toner can be utilized. Furthermore, even a high-gamma printer, for example, can employ this method to print an image satisfactorily.

A method of printing an image on a printing paper without using the OPC (as earlier described with reference to FIGS. 1 to 3) will be described below.

When the OPC is not used, the printing paper 5 is made negatively electrified, the toner that was positively electrified is put on the printing paper 5 with electrification, and this printing paper 5 is radiated with the laser beam, whereby the portion radiated with the laser beam becomes black in the printed image.

Therefore, since the video signal is inverted in polarity, the inverted video signal is processed by the chopper circuit 14. In this case, this signal becomes a signal that results from inverting the signals shown in FIGS. 5A, 5B in polarity.

The operation of printing an image on a printing paper by directly radiating the printing paper with a laser beam without using the OPC will be described below.

As shown in FIG. 4, when the video signal is supplied through the input terminal 13 to the chopper circuit 14, the chopper circuit 14 processes the video signal on the basis of the oscillation signal supplied thereto from the oscillation circuit 15. The signal thus processed by the chopper circuit 14 is supplied to the laser driver 16. Incidentally, the video signal may be inverted in polarity by the chopper circuit 14 or by the video signal processing circuit (not shown) provided in the laser printer body circuit 4.

The laser driver 16 drives the laser diode 3 on the basis of the signal from the chopper circuit 14. When the printing paper 5 is fed in the direction shown by the arrow y in FIG. 2, the printing surface of the printing paper 5 is negatively charged by the electrode 12 of the electrifying unit 10 as shown in FIG. 3A.

When the printing paper 5 reaches the toner supplying unit 11, as shown in FIG. 3B, the toner supplying unit 11 applies the toner (shown by "+" in FIG. 3B) on the printing surface of the printing paper 5 using electrostatic attraction.

Subsequently, when the laser beam w emitted from the laser diode 3 and reflected by the galvanometer 2, is radiated on the printing paper 5, as shown in FIG. 3C, the toner corresponding to the low level portion which becomes black in the video signal is melted and fixed onto the printing paper 5.

Figure 7A:
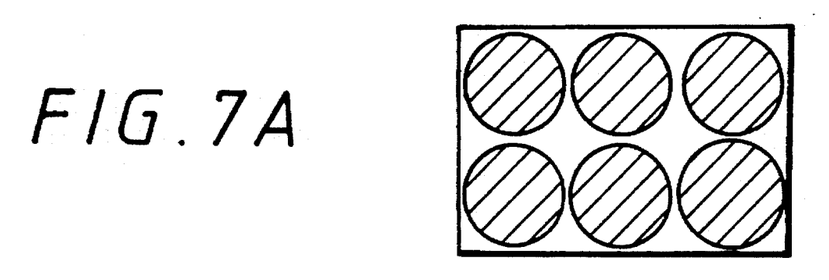
FIGS. 7A and 7B are respectively diagrams used to explain the laser diode driving apparatus according to the embodiment of the present invention.
Figure 7B:
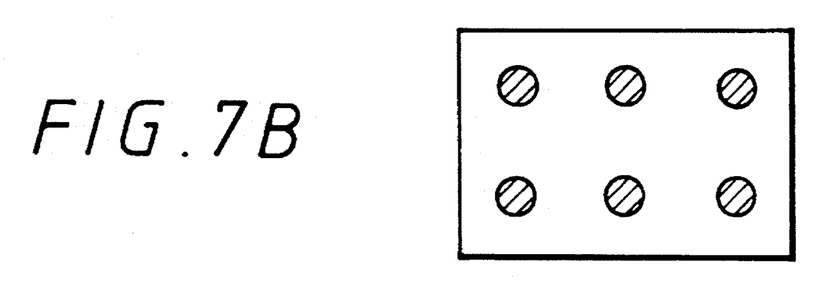

At that time, a diameter of the spot produced by the laser beam is varied in accordance with the level of the input signal as shown in FIGS. 7A and 7B. Therefore, when the diameter of the beam spot is large as shown in FIG. 7A, an image can be printed on the printing paper 5 with high density. When the diameter of the beam spot is small as shown in FIG. 7B, an image can be printed on the printing paper 5 with low density.

When the printing paper 5 that was placed in this state reaches the cleaning unit 9 (see FIG. 2), as shown in FIG. 3D, the printing paper 5 is positively electrified by the electrode 12 of the cleaning unit 9, whereby the unnecessary toner that is not melted and fixed on the printing paper 5 is eliminated from the printing paper 5 and then stored in the storage unit (not shown) of the cleaning unit 9.

As described above, according to this embodiment, since the toner is put on the printing paper with electrification and then fixed thereto by the laser beam radiation, the printing by the laser beam can be realized most easily without utilizing expensive parts such as a photosensitive material or the like and without enlarging the mechanism and the circuit of the apparatus. Further, since the video signal is intermittently held at "0" level and the laser diode 3 is driven on the basis of such signal, density of the printed image can be obtained in a wide range and the circuit arrangement of the apparatus can be simplified as compared with that provided by the pulse width modulation system. Further, an inexpensive toner can be utilized and the method of the present invention can be employed even by the high gamma printer, for example, to carry out the satisfactory printing.

According to the printing apparatus of the present invention, since the driving means produces the driving signal on the basis of input information, the dry-type toner is temporarily put on the printing paper with electrification by the toner supplying means, the laser beam output means is driven by the driving signal from the driving means to emit the laser beam, the dry-type toner put on the printing paper with electrification by the toner supplying means is melted and fixed thereon and the toner that is not melted on the printing paper is eliminated by the eliminating means, the printing by the laser beam can be realized most easily without utilizing the expensive parts such as the photosensitive material or the like and without enlarging the mechanism and the circuit scale of the apparatus.

Further, according to the arrangement of the printing apparatus of the present invention, since the printing paper is electrified by the electrifying unit and the toner which is put on the printing paper is electrified by the electrifying unit in addition to the aforesaid effects, the toner can be reliably and easily applied to the printing paper.

Further, according to the arrangement of the printing apparatus of the present invention, since the printing paper is electrified with a polarity opposite to the charged toner, the excess toner which is not melted and fixed to the paper by the laser beam is easily and reliably removed by the eliminating means.

Furthermore, according to the arrangement of the laser diode driving apparatus, since the input signal is area-modulated by the area modulating means and the driving means produces a driving signal on the basis of the modulated signal from the area modulating means to drive the laser diode to emit the laser beam, a so-called unprinted portion can be avoided and the density of the printed image can be varied over a wide range. Further, an inexpensive toner can be utilized and even the high gamma printer can adopt this method to thereby carry out the satisfactory printing.

Furthermore, according to the arrangement of the laser diode driving apparatus, since the pulse having the predetermined period is generated by the oscillation circuit and the input signal is processed by the chopper circuit on the basis of the pulse from the oscillation circuit, in addition to the aforesaid effects, the circuit arrangement of the apparatus can be simplified.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An apparatus for printing an image on a sheet of paper, comprising:

toner application means for applying a toner onto a surface of the sheet of paper, said toner application means including a first electrode means for inducing a first charge which persists over the entire surface of the sheet of paper and means for separately and discretely inducing a second and opposite charge in said toner, said toner being attracted to and maintained securely on the surface of the sheet of paper by the electrostatic attraction produced by the first and second charges induced on the surface of the sheet of paper and said toner, respectively;

means for generating a laser driving signal according to an input signal representing an image of varying intensity, said laser driving signal generating means comprising area modulation means for modulating said laser driving signal to vary the diameter of the laser beam spot in accordance with changes in said input signal such that the density of toner fixed on said paper varies in accordance with changes in the image intensity;

means for outputting a laser beam which is variable in accordance with the laser driving signal, said laser beam melting the toner on the sheet of paper such that the melted toner is fixed to the surface of the sheet of paper by a laser beam spot incident upon the toner and means for removing toner which is not melted by said laser beam, said toner removing means including a second electrode means for neutralizing the first charge on the sheet of paper and for inducing the second charge on the surface of the sheet of paper and therefore inducing repulsion between the sheet of paper and toner which is not fixed to the sheet of paper.

2. The apparatus according to claim 1, wherein said area modulation means comprises means for generating a pulse signal having a predetermined frequency and means for processing said input signal in a chopper process according to said pulse signal.

3. The apparatus according to claim 1, wherein said toner comprises a dry-type toner.

4. An apparatus for printing an image on a at least one of sheet and a web, comprising:

means for charging a surface of said at least one of said sheet and web with a charge having a first polarity;

means for separately and discretely charging a dry particulate toner with a charge having a second polarity and applying the charged toner said at least one of said sheet and web;

means for generating a laser driving signal according to an input signal representing an image;

means for outputting a laser beam according to the laser driving signal to melt the toner such that the toner is fixed upon the surface of said at least one of sheet and web by the laser beam; and means for charging said at least one of the sheet and web with a charge having said second polarity and for removing the toner which is not melted by said laser beam by electrostatic repulsion.

5. A method of printing an image on a paper, comprising the steps of:

charging a sheet of paper with a persistent charge having a first polarity;

separately and discretely charging a dry particulate toner with a charge having a second polarity;

applying the charged toner uniformly over a predetermined area of said charged sheet of paper so that the toner is secured to said predetermined area by an electrostatic attraction produced by the difference between the first and second polarities;

generating a laser driving signal according to an input signal representing an image;

generating a laser beam so that the laser beam has an intensity which is variable in accordance with said laser driving signal;

irradiating the toner on said sheet of paper with said laser and melting a selected portion of the toner on said the sheet of paper such that the selected portion of the toner is fixed upon the surface of said sheet of paper; and removing a remaining portion of the toner which is not melted by said melting step and which is not secured to said sheet of paper by changing the charge on said charged sheet of paper from said first polarity to said second polarity.

6. An apparatus for printing an image on a paper, comprising:

toner application means for applying a dry particulate toner on a surface of a sheet of paper, said toner application means including means for inducing a first charge which persists over the entire surface of the paper and means for separately and discretely inducing a second and opposite charge in said toner, said toner being attracted to and secured to the surface of the paper by an electrostatic attraction produced by the first and second charges induced on the surface of the sheet paper and said toner, respectively;

means for outputting a laser beam which is variable in accordance with a laser driving signal, said laser beam melting and discharging toner on said paper such that the toner which is melted is fixed to the surface of the paper by a laser beam spot incident upon the toner;

means for generating said laser driving signal according to an input signal representing an image of varying intensity, said laser driving signal generating means producing said laser driving signal in a manner which drives said laser beam outputting means to produce an intermediate tone by area modulation of said laser beam in accordance with a pseudo grey scale; and means for removing toner which is not melted by said laser beam, said toner removing means including means for neutralizing the first charge on the paper and for inducing a charge on the surface of the sheet which is opposite to the first charge and which induces repulsion between the sheet of paper and toner which is not fixed to the sheet of paper.

7. An apparatus for printing an image on a sheet of paper, comprising:

a rotatable cylindrical drum on which said sheet of paper is supported and transported continuously from a point of introduction to a point of exodus;

paper electrification means, mounted at a first angular position juxtaposed an external surface of said drum, for inducing a persistent charge having a first polarity over an outer surface of said sheet of paper;

toner application means, mounted at a second angular position juxtaposed the external surface of said drum, for imparting a charge having a second polarity on a dry particular toner and for dispersing the charged toner over a surface of said charge sheet;

laser beam means for producing a laser beam and for irradiating the toner which is spread over the surface of said charged sheet in a manner to melt a selected portion of the toner and cause the selected portion to become discharged and fixed to said charged sheet; and excess toner removal means, mounted at a third angular position juxtaposed the external peripheral surface of said drum, for inducing a charge having said second polarity in said charged sheet after it has been irradiated with said laser beam, and for conditioning said charged sheet so that said charged sheet actively repels excess unmelted toner from said sheet.

8. An apparatus as set forth in claim 7, wherein said drum is rotated in one rotational direction only.

9. An apparatus as set forth in claim 7, wherein said laser beam means includes a circuit for modulating a laser driving signal to vary the diameter of a laser beam spot in accordance with changes in an input signal.

* * * * *